(12) United States Patent
Azzi et al.

(10) Patent No.: US 12,723,145 B2
(45) Date of Patent: Sep. 1, 2026

(54) POLYMER COMPOSITIONS WITH LOW WARPAGE

(71) Applicant: FINA TECHNOLOGY, INC., Houston, TX (US)

(72) Inventors: Joachim Azzi, Houston, TX (US); Fengkui Li, Houston, TX (US); Andy Culkin, League City, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 742 days.

(21) Appl. No.: 16/795,146

(22) Filed: Feb. 19, 2020

(65) Prior Publication Data

US 2020/0263000 A1 Aug. 20, 2020

Related U.S. Application Data

(60) Provisional application No. 62/807,954, filed on Feb. 20, 2019.

(51) Int. Cl.

| | |
|---|---|
| ***C08K 3/34*** | (2006.01) |
| ***B29C 45/00*** | (2006.01) |
| *B29K 23/00* | (2006.01) |
| *B29K 509/00* | (2006.01) |

(52) U.S. Cl.

CPC ............ *C08K 3/34* (2013.01); *B29C 45/0001* (2013.01); *B29K 2023/12* (2013.01); *B29K 2509/00* (2013.01); *C08K 2201/005* (2013.01)

(58) Field of Classification Search

CPC ............................ C08K 3/34; C08K 2201/005

See application file for complete search history.

(56) References Cited

U.S. PATENT DOCUMENTS

| | | |
|---|---|---|
| 3,687,920 A | 8/1972 | Johnson |
| 4,086,408 A | 4/1978 | Karol et al. |
| 4,101,445 A | 7/1978 | Levine et al. |
| 4,107,413 A | 8/1978 | Giannini et al. |
| 4,114,319 A | 9/1978 | Governale |
| 4,220,554 A | 9/1980 | Scata et al. |
| 4,294,721 A | 10/1981 | Cecchin et al. |
| 4,298,718 A | 11/1981 | Mayr et al. |
| 4,376,191 A | 3/1983 | Geck |
| 4,439,540 A | 3/1984 | Cecchin et al. |
| 4,460,701 A | 7/1984 | Terano et al. |
| 4,482,687 A | 11/1984 | Noshay et al. |
| 4,530,914 A | 7/1985 | Ewen et al. |
| 4,542,199 A | 9/1985 | Kaminsky et al. |

(Continued)

FOREIGN PATENT DOCUMENTS

| | | |
|---|---|---|
| EP | 0 277 003 A1 | 8/1988 |
| EP | 0 277 004 A1 | 8/1988 |

(Continued)

OTHER PUBLICATIONS

PCT/US2020/018862 International Search Report and Written Opinion dated May 19, 2020 (4 p.).

(Continued)

*Primary Examiner* — James Sanders
(74) *Attorney, Agent, or Firm* — CONLEY ROSE, P.C.

(57) ABSTRACT

Polymer compositions and uses thereof are described. A polymeric composition can include a polyolefin polymer and a nucleating agent having an average particle size of less than 2 micrometers.

25 Claims, 3 Drawing Sheets

(56) References Cited

U.S. PATENT DOCUMENTS 4,543,399 A 9/1985 Jenkins, III et al.
4,544,717 A 10/1985 Mayr et al.
4,560,671 A 12/1985 Gross et al.
4,562,173 A 12/1985 Terano et al.
4,588,790 A 5/1986 Jenkins, III et al.
4,665,208 A 5/1987 Welborn et al.
4,701,432 A 10/1987 Welborn
4,719,193 A 1/1988 Levine et al.
4,755,495 A 7/1988 Cann et al.
4,769,910 A 9/1988 Noon
4,794,096 A 12/1988 Ewen
4,808,561 A 2/1989 Welborn
4,871,705 A 10/1989 Hoel
4,874,734 A 10/1989 Kioka et al.
4,908,463 A 3/1990 Bottelberghe
4,924,018 A 5/1990 Bottelberghe
4,931,417 A 6/1990 Miya et al.
4,933,403 A 6/1990 Kaminsky et al.
4,937,299 A 6/1990 Ewen et al.
4,952,540 A 8/1990 Kioka et al.
4,968,827 A 11/1990 Davis
4,975,403 A 12/1990 Ewen
4,987,200 A 1/1991 Datta et al.
5,017,714 A 5/1991 Welborn
5,019,633 A 5/1991 Wagner et al.
5,026,798 A 6/1991 Canich
5,028,670 A 7/1991 Chinh et al.
5,057,475 A 10/1991 Canich et al.
5,066,738 A 11/1991 Ewen
5,070,055 A 12/1991 Schramm et al.
5,091,352 A 2/1992 Kioka et al.
5,103,031 A 4/1992 Smith et al.
5,120,867 A 6/1992 Welborn
5,132,381 A 7/1992 Winter et al.
5,145,819 A 9/1992 Winter et al.
5,155,180 A 10/1992 Takada et al.
5,198,401 A 3/1993 Turner et al.
5,204,419 A 4/1993 Tsutsui et al.
5,206,199 A 4/1993 Kioka et al.
5,235,081 A 8/1993 Sangokoya
5,239,022 A 8/1993 Winter et al.
5,243,001 A 9/1993 Winter et al.
5,248,801 A 9/1993 Sangokoya
5,276,208 A 1/1994 Winter et al.
5,278,119 A 1/1994 Turner et al.
5,296,434 A 3/1994 Karl et al.
5,304,614 A 4/1994 Winter et al.
5,308,815 A 5/1994 Sangokoya
5,317,036 A 5/1994 Brady, III et al.
5,324,800 A 6/1994 Welborn et al.
5,329,032 A 7/1994 Tran et al.
5,329,033 A 7/1994 Spaleck et al.
5,350,723 A 9/1994 Neithamer et al.
5,352,749 A 10/1994 DeChellis et al.
5,374,752 A 12/1994 Winter et al.
5,391,790 A 2/1995 Rohrmann et al.
5,405,922 A 4/1995 DeChellis et al.
5,436,304 A 7/1995 Griffin et al.
5,436,305 A 7/1995 Alt et al.
5,456,471 A 10/1995 MacDonald
5,462,999 A 10/1995 Griffin et al.
5,510,502 A 4/1996 Sugano et al.
5,525,678 A 6/1996 Mink et al.
5,532,396 A 7/1996 Winter et al.
5,543,373 A 8/1996 Winter et al.
5,554,704 A 9/1996 Burkhardt et al.
5,616,661 A 4/1997 Eisinger et al.
5,627,242 A 5/1997 Jacobsen et al.
5,635,437 A 6/1997 Burkhardt et al.
5,643,847 A 7/1997 Walzer
5,665,818 A 9/1997 Tilston et al.
5,668,228 A 9/1997 Chinh et al.
5,672,668 A 9/1997 Winter et al.
5,677,375 A 10/1997 Rifi et al.
6,087,291 A 7/2000 Speca et al.
6,100,214 A 8/2000 Walzer et al.
6,114,479 A 9/2000 Speca et al.
6,117,955 A 9/2000 Agapiou et al.
6,124,230 A 9/2000 Speca et al.
6,140,432 A 10/2000 Agapiou et al.
6,143,686 A 11/2000 Vizzini et al.
6,147,173 A 11/2000 Holtcamp
6,180,735 B1 1/2001 Wenzel
6,194,341 B1 2/2001 Canich et al.
6,207,606 B1 3/2001 Lue et al.
6,211,105 B1 4/2001 Holtcamp
6,218,558 B1 4/2001 Kato et al.
6,228,795 B1 5/2001 Vizzini
6,242,545 B1 6/2001 Jejelowo et al.
6,245,705 B1 6/2001 Kissin
6,245,706 B1 6/2001 Hlatky
6,245,868 B1 6/2001 Agapiou et al.
6,248,845 B1 6/2001 Loveday et al.
6,252,097 B1 6/2001 Sugano et al.
6,255,515 B1 7/2001 Kato et al.
6,271,323 B1 8/2001 Loveday et al.
6,274,684 B1 8/2001 Loveday et al.
6,300,415 B1 10/2001 Okayama et al.
6,300,436 B1 10/2001 Agapiou et al.
6,339,134 B1 1/2002 Crowther et al.
6,340,730 B1 1/2002 Murray et al.
6,346,586 B1 2/2002 Agapiou et al.
6,359,072 B1 3/2002 Whaley
6,376,407 B1 4/2002 Burkhardt et al.
6,376,408 B1 4/2002 Burkhardt et al.
6,376,409 B1 4/2002 Burkhardt et al.
6,376,410 B1 4/2002 Burkhardt et al.
6,376,411 B1 4/2002 Burkhardt et al.
6,376,412 B1 4/2002 Burkhardt et al.
6,376,413 B1 4/2002 Kuchta et al.
6,376,627 B1 4/2002 Burkhardt et al.
6,380,120 B1 4/2002 Burkhardt et al.
6,380,121 B1 4/2002 Kuchta et al.
6,380,122 B1 4/2002 Kuchta et al.
6,380,123 B1 4/2002 Kuchta et al.
6,380,124 B1 4/2002 Burkhardt et al.
6,380,328 B1 4/2002 McConville et al.
6,380,330 B1 4/2002 Burkhardt et al.
6,380,331 B1 4/2002 Kuchta et al.
6,380,334 B1 4/2002 Kuchta et al.
6,399,723 B1 6/2002 Burkhardt et al.
6,420,580 B1 7/2002 Holtcamp et al.
6,489,426 B1 12/2002 Kawamoto et al.
6,653,254 B1 11/2003 Shamshoum et al.
7,056,991 B2 6/2006 Tharappel et al.
7,445,827 B2 11/2008 Le et al.
2004/0033349 A1 2/2004 Henderson
2007/0128388 A1 6/2007 Le et al.
2009/0305069 A1 12/2009 Goeldel et al.
2012/0094049 A1 4/2012 Killough
2015/0072127 A1 3/2015 Bayona et al.
2016/0145412 A1 5/2016 Lake, Jr. et al.
2019/0284217 A1* 9/2019 Mizushima ............ C08K 5/098

FOREIGN PATENT DOCUMENTS

EP 0 279 586 A2 8/1988
EP 0 426 637 A2 5/1991
EP 0 495 375 A2 7/1992
EP 0 500 944 A1 9/1992
EP 0 520 732 A1 12/1992
EP 549 900 A1 7/1993
EP 0 561 476 A1 9/1993
EP 0 570 982 A1 11/1993
EP 0 573 403 A2 12/1993
EP 576 970 A1 1/1994
EP 0 594 218 A1 4/1994
EP 611 773 A2 8/1994
JP 2001302723 A 10/2001
WO 92/00333 A2 1/1992
WO 94/07928 A1 4/1994
WO 94/10180 A1 5/1994

(56) References Cited

FOREIGN PATENT DOCUMENTS

| | | | |
|---|---|---|---|
| WO | 97/32906 | A1 | 9/1997 |
| WO | 98/22486 | A1 | 5/1998 |
| WO | 00/12565 | A1 | 3/2000 |

OTHER PUBLICATIONS

Malacari, Piergiovanni Ercoli, "Effect of Both Talc Fineness and Talc Loading on Heterogeneous Nucleation of Block Copolymer Polypropylene," Society of Plastics Engineers, vol. 3, Dec. 31, 2009 (7 p.).

PCT/US2020/018862 International Search Report on Patentability dated Sep. 2, 2021 (10 p.).

European Rule 161 Communication dated Sep. 28, 2021, for European Application No. 20714042.7 (3 p.).

Mexican Office Action dated Oct. 2, 2025, for Mexican Application No. MX/a/2019/004273 (19 p.).

Mexican Office Action dated Jan. 22, 2026, for Mexican Application No. MX/a/2021/006769 (9 p.).

* cited by examiner

POLYMER COMPOSITIONS WITH LOW WARPAGE

CROSS REFERENCE TO RELATED APPLICATIONS

This application claims the benefit of U.S. Provisional Application No. 62/807,954, filed Feb. 20, 2019, which is incorporated herein by reference in its entirety for all purposes.

BACKGROUND OF THE INVENTION

A. Field of the Invention

The invention generally concerns polymeric compositions that include a polyolefin polymer and a nucleating agent having an average particle size of less than 2 micrometers (μm). Articles that include these compositions exhibit low warpage.

B. Description of Related Art

Polypropylene materials, formed by catalysts such as Ziegler-Natta or metallocene compounds, are among the most versatile and commonly used thermoplastics for commercial manufacture of molded plastic products. These materials can be formed into a variety of end-use articles ranging from automobile parts to food containers using a number of plastics shaping processes. One such process is injection molding.

In injection molding, a plastic component can be formed from molten polymer resin that is injected into a mold cavity. The molten resin can be held in the cavity for a sufficient time period to allow the part component to form. The time required from molding to cooling and removal from the cavity, or the cooling phase, is an important factor in the production time and therefore in the manufacturing efficiency. Resin properties such as thermal expansion and compressibility determine the extent to which a molten resin will undergo dimensional changes during the cooling phase. These dimensional changes that occur during the cooling phase are termed shrinkage. During the manufacturing of plastic components, shrinkage results in a volume difference between the initially cast mold and the final molded article. If the dimensional changes are uniform, the shrinkage is termed isotropic. If the dimensional changes are non-uniform or varying, the shrinkage is termed anisotropic or differential. The shrinkage, whether isotropic or anisotropic, must be accurately accounted for in the manufacturing of plastic components in order to obtain end-use articles of the correct dimensions. Shrinkage, notably differential shrinkage, can lead to warpage or deformation of a molded part.

Given the foregoing discussion, it would be desirable to develop a method of manufacturing end-use articles from a polymeric resin having a reduced amount of warpage. It would also be desirable for this polymeric resin to display enhanced mechanical properties such as impact strength and stiffness.

SUMMARY OF THE INVENTION

A discovery has been found that provides a solution to at least some of the problems associated with shrinkage when producing injection molded materials. The solution is premised on a composition that includes a polyolefin polymer and a nucleating agent having an average particle size of less than 2 micrometers (μm). The composition of the present invention exhibits more homogeneous isotropic shrinkage properties in both longitudinal and transversal directions and better impact properties compared to compositions made using nucleating particles having an average particle size greater than 2 μm. Specifically, the isotropic shrinkage was 0 to 15% and the IZOD impact was at least 20 ft./lb. when using nucleating agents of less than, but not equal to, 2 μm. Without wishing to be bound by theory, it is believed that the very small sized nucleating particles are more uniformly dispersed in the polyolefin polymer, thus creating more homogeneous spherulites within the polymer matrix. Consequently, shrinkage is similar in all directions due to this uniform "polyolefin crystals cloud" within the polymer matrix.

In a particular aspect of the invention, polymer compositions are described. A polymeric composition can include a polyolefin polymer and a nucleating agent having an average particle size of less than 2 μm. Particle size can be determined using known commercial instrumentation. By way of example, particle size can be determined using a SEDIGRAPH® instrument from Micromeritics (U.S.A.). The average particle size of the nucleating agent can be from 0.001 μm to 1.9 μm, from 0.6 μm to 1.0 μm, or about 0.8 μm. The composition can include from 100 parts per million (ppm) to 20,000 ppm by weight of the nucleating agent, or about 1000 ppm. In some instances, the composition can have an isotropic and/or a differential shrinkage less than the isotropic and/or differential shrinkage of a comparable polymeric composition that includes the same polyolefin polymer and the same nucleating agent, but the same nucleating agent has an average particle size greater than, or equal to, 2 μm. The isotropic shrinkage of the composition of the inventive composition can be less than 80% of the comparative sample. In some embodiments, the isotropic shrinkage of the composition of the present invention is 0% to 15%, or 0% to 5%, or 0% to 1%. An Izod impact value (e.g., at least 20 ft./lb., or at least 24 ft./lb.) of the polymer composition of the present invention can be at least 25%, at least 50%, or 25% to 60%, as compared to a comparable polymeric composition comprising the same polymer and the same nucleating agent, but where the same nucleating agent has an average particle size greater than, or equal to, 2 μm. Izod impact can be measured by ASTM D-256-10. The polyolefin polymer can include polypropylene (PP), polyethylene (PE) or both. In some instances the polyolefin polymer can include a homopolymer, a random copolymer, an impact copolymer, or any combination thereof. In some instances, the composition can include PP and up to about 5 wt. % of another C2-Cs alpha olefin. In some embodiments, the polyolefin has a melt flow rate of the polyolefin polymer can be from about I g/10 min. to about 200 g/10 min. and/or a xylene insolubles (XS) can range from 3.5 to 4.5 wt. %, or combinations thereof. In one instance, the composition can be PP that has 0.5 to I wt. % of a C2 olefin, a melt flow rate of the polyolefin polymer can be from about I g/10 min. to about 50 g/10 min., and a XS of 3.5 to 4.5 wt. %. In some instances, the polymer composition can include an additive (e.g., an antioxidant, a neutralizing agent, an antistatic agents, a slip agent, a colorant, a mold release agent, an ultra-violet (UV) screening agent, an oxidant, an UV light absorbent, a fire retardant, a pigment, a dye, a filler, a flow modifier, or any combination thereof).

Also disclosed are articles of manufacture that include the polymer composition of the present invention. The article can be an automobile part, a food container, a cap, a computer product, a fiber, a pipe, a film, a bottle, a non-food container, a cup, a lid, a plate, a tray, and a blister pack, artificial turf (pellets, mat, blades, etc.), etc.

In another aspect of the present invention, methods of making articles of manufacture that include the polymer composition of the present invention are described. A method can include shaping the polymeric composition. Shaping can include injecting a flowable polymeric composition into a mold; solidifying the polymeric composition; and releasing the solidified composition from the mold. The volume difference between the flowable polymeric composition and the solidified composition can be from 0 to 15%. In some embodiments, the injection molding of the polymeric composition into the article of manufacture can include a cycle time of equal to or less than about 10 seconds, or less than 7 seconds.

In another embodiment, a method of reducing warpage in a polyolefin polymer, comprises adding a nucleating agent having an average particle size of less than 2 micrometers (μm) to the polyolefin polymer to form the polyolefin composition.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to other aspects of the invention. It is contemplated that any embodiment discussed herein can be implemented with respect to any method or composition of the invention, and vice versa. Furthermore, compositions and kits of the invention can be used to achieve methods of the invention.

The following includes definitions of various terms and phrases used throughout this specification.

The phrases "nucleating agent" or "nucleating particle" refer to compounds that increase the rate of crystallization of the polymer.

The term "warpage" refers to a distortion where the surfaces of an end-use article do not follow the intended shape of the design (e.g., mold).

The term "isotropic shrinkage" refers to uniform shrinkage in all directions and results in an end-use article that is smaller than intended. The terms "anisotropic shrinkage" or differential shrinkage, refers to shrinkage that is not uniform in each direction and results in warpage of an end-use article. Shrinkage can be calculated by first measuring the length of contraction upon cooling in the in-flow direction (termed longitudinal direction when measuring differential shrinkage) and the length of contraction occurring in the cross-flow direction (termed transverse direction when measuring differential shrinkage). The difference in the in-flow and cross-flow contractions multiplied by 100% gives the percent shrinkage. Measurements of shrinkage are limited to measuring the changes in the direction of resin flow and in a direction perpendicular to the direction of resin flow. Shrinkage can be measured using an optical device as described in U.S. Pat. No. 7,445,827 or a computerized numerical control (CNC) microscope. An example of a CNC microscope is a QV APEX 302 (Mitutoyo, USA). The polymeric specimen can be a. 60×60×2 mm polymeric specimen formed in accordance with ISO 294-3 type D2 mold from polymeric compositions of this disclosure. An optical measurement of the specimen length is performed by placing the polymeric specimen on a positioning table and setting the positioning table under a microscope camera that is in communication with a microprocessor. The position of both edges of a polymeric specimen is recorded at the start and end of a period of time with the help of a specific mark on a display screen of the microprocessor. The specimen length or width is subsequently deduced from the change in position observed over the period of time. The processing parameters for shrinkage measurements are based on ISO 294-3 and ISO 294-1 with two noticeable differences: (1) the holding pressure can be chosen on the same material from 20 MPa, 40 MPa, 60 MPa or 80 MPa and (2) the holding time is kept to a minimum.

The phrases "melt flow rate" or "melt index (MFR or MI2)" refer to the measurement of the ease of flow of the melt of a thermoplastic polymer or blend. Herein "melt flow rate" or MFR is used for polypropylene and "melt index" or "MI2" is used for polyethylene and polyethylene-rich blends. MFR values referred to herein are those determined according to ASTM D 1238 at a temperature of 230° C. with a ram weight of 2.16 kg. MFR measurements reported herein were conducted using a Tinuius-Olsen (USA) MP1200 melt flow indexer. MI2 values referred to herein are those determined according to ASTM D1238 at a temperature of 190° C. with a ram weight of 2.16 kg. MI2 measurements reported herein were conducted using a Tinuius-Olsen MP993 melt flow indexer.

The phrase "intrinsic viscosity" refers to the capability of a polymer in solution to increase the viscosity of said solution. Intrinsic viscosity can be determined in accordance with ASTM D-5225-117.

The term "viscosity" is defined herein as the resistance to flow due to internal friction.

The terms "about" or "approximately" are defined as being close to as understood by one of ordinary skill in the art. In one non-limiting embodiment, the terms are defined to be within 10%, within 5%, within 1%, and or within 0.5%.

The terms "wt. %," "vol. %," or "mol. %" refers to a weight percentage of a component, a volume percentage of a component, or molar percentage of a component, respectively, based on the total weight, the total volume of material, or total moles, that includes the component. In a non-limiting example, 10 grams of component in 100 grams of the material is 10 wt. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The polymer compositions of the present invention can "comprise," "consist essentially of," or "consist of" particular ingredients, components, compositions, etc. disclosed throughout the specification. With respect to the transitional phrase "consisting essentially of," in one non-limiting aspect, a basic and novel characteristic of the polymer compositions of the present invention are their abilities to be injected molded with uniform and/or reduced shrinkage.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings.

Figure 1:
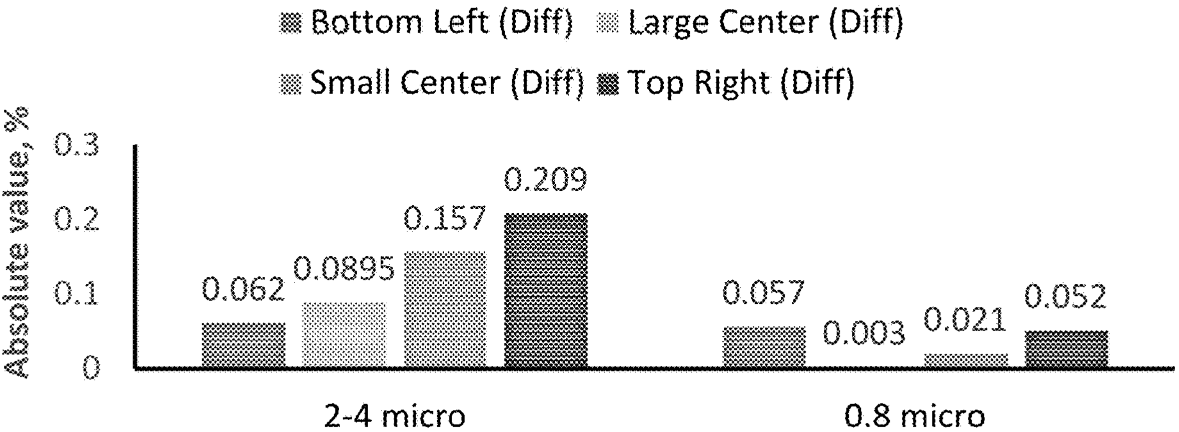
FIG. 1 shows the effect of the average particle size of the nucleating agent of the present invention having an average particle size of 0.8 microns versus a comparative nucleating agent having a particle size of 2 to 4 microns on warpage of a polypropylene polymer.

While the invention is susceptible to various modifications and alternative forms, specific embodiments thereof are shown by way of example in the drawings. The drawings may not be to scale.

DETAILED DESCRIPTION OF THE INVENTION

A discovery has been made that provides a solution to at least some of the problems associated with injection molding of polymer compositions. The discovery is premised on using nucleating agents than have an average particle size of less than, but not equal to, 2 μm. The resulting polymer composition and articles of manufacture made therefrom have less warpage and enhanced toughness. Without wishing to be bound by theory, it is believed that uniform dispersion of the polymer crystals (e.g., PP crystals) within the polymer matrix can act as a physical barrier to growing cracks. A better dispersion can prevent any "weak spots", and less warpage can lead to less "tension" within the matrix, resulting in better impact properties for the molded article of manufacture. Still further, use of smaller sized nucleating agents (less than 2 μm) can result in uniform shrinkage in all directions, if shrinkage occurs at all. Also, uniform shrinkage can result in less warpage of injected molded articles of manufacture upon cooling without significantly affecting other mechanical and optical properties.

These and other non-limiting aspects of the present invention are discussed in further detail in the following sections.

A. Materials

The polymer composition can include a polyolefin polymer, a nucleating agent having an average particle size of 2 and optional additives.

1. Polyolefin Polymer

The polyolefin polymer can be a thermoplastic polymer. The polymer can be a homopolymer, a random copolymer, an impact copolymer, or any combination thereof. Non-limiting examples of polyolefins include polypropylenes and polyethylenes. Polyolefins can be prepared by any of the polymerization processes (e.g., a "high pressure" process, a slurry process, a solution process and/or a gas phase process) with the use of any of the known polymer polymerization catalysts (e.g., Ziegler Natta catalysts, chromium or Phillips catalysts, single site catalysts, metallocene catalysts, and the like). Polyethylenes can include homopolymers of ethylene or copolymers of ethylene with at least one alpha olefin (e.g., butene, hexene, octene and the like). Non-limiting examples of polyethylenes include low density polyethylene (LDPE), a linear low density polyethylene (LLDPE), a medium density polyethylene (MDPE), a high density polyethylene (HDPE), an ethylene copolymer, or blends thereof. Polypropylenes include homopolymers of propylene, copolymers of propylene and other olefins, and terpolymers of propylene, ethylene, and dienes. A controlled rheology grade polypropylene (CRPP) is one that has been further processed (e.g., through a degradation process) to produce a polypropylene polymer with a targeted high melt flow index (MFI), lower molecular weight, and/or a narrower molecular weight distribution than the starting polypropylene. Reactor grade also termed low order polypropylene can be used. The polyolefin can also be prepared using any other method such as a combination of Ziegler-Natta and metallocene catalysts, for example as described in U.S. Pat. Nos. 7,056,991 and 6,653,254. The polyolefin polymer can have a melt flow rate of 1.0 g/10 min to 200 g/10 min or at least any one of, equal to any one of, or between any one of 0.1, 0.5, 1, 10, 20, 30, 40, 50, 60, 70, 80, 90 100, 110, 120, 130, 140, 150, 160, 170, 180, 190 and 200 g/10 min. The polyolefin polymer can have a XS of 3.5 to 4.5 wt. %, or at least any one of, equal to any one of, or between any two of 3.5, 3.6, 3.7, 3.8, 3.9, 4, 4.1, 4.2, 4.3, 4.4, 4.5 wt. %. A polyolefin homopolymer (e.g. PP homopolymer) can include from 0 wt. % to about 5% (e.g., 0, 1, 2, 3, 4, 5 wt. % and any value or range in between) of another alpha-olefin, including but not limited to $C_2$-$C_8$ alpha-olefins such as ethylene, 1-butene, and 1-hexene. Homopolymer can be prepared or obtained through commercial sources such as TOTAL Petrochemicals, France and/or Total Petrochemicals USA Inc. Non-limiting examples of homopolymers and copolymers include TOTAL Polypropylene 3620WZ and TOTAL polypropylene 3727WZ.

In some embodiments, the polyolefin polymer is a polypropylene impact copolymer (Ppic). The copolymer phase of a PPic can be a random copolymer of propylene and ethylene, also referred to as an ethylene/propylene rubber (EPR). Without wishing to be limited by theory, the EPR portion of the PPic has rubbery characteristics which, when incorporated within the matrix of the homopolymer component, can function to provide increased impact strength to the PPic. In an embodiment, the EPR portion of the PPic comprises greater than about 14 wt. % of the PPic, alternatively greater than about 18 wt. % of the PPic, alternatively from about 14 wt. to about 18 wt. of the PPic. The amount of ethylene present in the EPR portion of the PPic can be from about 38% to about 50%, alternatively from about 40% to about 45% based on the total weight of the EPR portion. The amount of ethylene present in the EPR portion of the PPic can be determined spectrophotometrically using a Fourier transform infrared spectroscopy (FTIR) method. Specifically, the FTIR spectrum of a polymeric sample is recorded for a series of samples having a known EPR ethylene content. The ratio of transmittance at 720 $cm^{-1}$/900 $cm^{-1}$ can be calculated for each ethylene concentration and a calibration curve is constructed. Linear regression analysis on the calibration curve is carried out to derive an equation that is then used to determine the EPR ethylene content for a sample material. The EPR portion of the PPic can exhibit an intrinsic viscosity different from that of the propylene homopolymer component. In an embodiment, the intrinsic viscosity of the EPR portion of the PPic can be greater than about 2.0 dl/g, alternatively from about 2.0 dl/g to about 3.0 dl/g, alternatively from about 2.4 dl/g to about 3.0 dl/g, alternatively from about 2.4 dl/g to about 2.7 dl/g, alternatively from about 2.6 dl/g to about 2.8 dl/g. In an embodiment, the PPic can have a melt flow rate (MFR) of from about 65 g/10 min. to about 130 g/10 min., alternatively from about 70 g/10 min. to about 120 g/10 min., alternatively from about 70 g/10 min. to about 100 g/10 min., alternatively from about 70 g/10 min. to about 90 g/10 min., alternatively from about 75 g/10 min. to about 85 g/10 min., alternatively about 90 g/10 min. Excellent flow properties as indicated by a high MFR allow for high throughput manufacturing of molded polymeric components. In an embodiment, the PPic is a reactor grade resin without modification. In some embodiments, the PPic is a controlled rheology grade resin. PPics and other impact copolymers can be obtained through commercial sources or manufactured. Representative examples of suitable PPics include without limitation TOTAL polypropylene 4920W and TOTAL polypropylene 4920WZ are impact copolymer resins available from Total Petrochemicals USA Inc.

Ziegler-Natta Catalysts

Traditionally, catalyst systems used in bulk loop reactors for the commercial production (polymer production in the range of between 1 and up to 5 tons/hour and desirably between at least 1 ton to at least 50 tons/hour over a period of between at least about 5 days up to at least about 2 years) of polyolefin (e.g., polypropylene or polyethylene) homopolymers and/or copolymers are commonly known as conventional Ziegler-Natta catalyst systems (hereafter can also be referred to as "Ziegler-Natta catalysts" or "Ziegler-Natta catalyst systems"). Non-limiting examples of conventional Ziegler-Natta catalysts are described in U.S. Pat. Nos. 4,701,432; 4,987,200; 3,687,920; 4,086,408; 4,376,191; 5,019,633; 4,482,687; 4,101,445; 4,560,671; 4,719,193; 4,755,495; and 5,070,055, each of which is incorporated by reference herein in its entirety. These Ziegler-Natta catalyst systems can include a Ziegler-Natta catalyst, a support, one or more internal donors, and one or more external donors.

Conventional Ziegler-Natta catalysts are stereospecific complexes formed from a transition metal halide and a metal alkyl or hydride and can produce isotactic polypropylenes. The Ziegler-Natta catalysts are derived from a halide of a transition metal, such as titanium, chromium or vanadium with a metal hydride and/or metal alkyl, typically an organoaluminum compound as a co-catalyst. The catalyst can include a titanium halide supported on a magnesium compound. Ziegler-Natta catalysts, such as titanium tetrachloride ($TiCl_4$) supported on an active magnesium dihalide, such as magnesium dichloride or magnesium dibromide, as disclosed, for example, in U.S. Pat. Nos. 4,298,718 and 4,544,717, both to Mayr et al. are supported catalysts. Silica can also be used as a support. The supported catalyst can be employed in conjunction with a co-catalyst such as an alkylaluminum compound, for example, triethylaluminum (TEAL), trimethyl aluminum (TMA) and triisobutyl aluminum (TIBAL).

Conventional Ziegler-Natta catalysts can be used in conjunction with one or more internal electron donors. These internal electron donors are added during the preparation of the catalysts and can be combined with the support or otherwise complexed with the transition metal halide. A suitable Ziegler-Natta catalyst containing a diether-based internal donor compound is that available as Mitsui RK-100 and Mitsui RH-220, both manufactured by Mitsui Chemicals, Inc., Japan. The RK-100 catalyst additionally includes an internal phthalate donor. The Ziegler-Natta catalyst can be a supported catalyst. Suitable support materials include magnesium compounds, such as magnesium halides, dialkoxymagnesiums, alkoxymagnesium halides, magnesium oxyhalides, dialkylmagnesiums, magnesium oxide, magnesium hydroxide, and carboxylates of magnesium. Typical magnesium levels are from about 12% to about 20% by weight of catalyst. The RK-100 catalyst contains approximately 2.3% by weight titanium, with approximately 17.3% by weight magnesium. The RH-220 catalyst contains approximately 3.4% by weight titanium, with approximately 14.5% by weight magnesium.

Conventional Ziegler-Natta catalysts can also be used in conjunction with one or more external donors. Generally such external donors act as stereoselective control agents to control the amount of atactic or non-stereoregular polymer produced during the reaction, thus reducing the amount of xylene solubles. Examples of external donors include the organosilicon compounds such as cyclohexylmethyl dimethoxysilane (CMDS), dicyclopentyl dimethoxysilane (CPDS) and diisopropyl dimethoxysilane (DIDS). External donors, however, can reduce catalyst activity and can tend to reduce the melt flow of the resulting polymer.

Metallocene Catalyst System

Other catalyst systems useful for polymerizing polyolefins (e.g., PP and PE) are based upon metallocenes. Metallocenes can be characterized generally as coordination compounds incorporating one or more cyclopentadienyl (Cp) groups (which can be substituted or unsubstituted and can be the same or different) coordinated with a transition metal through π bonding. The Cp groups can also include substitution by linear, branched or cyclic hydrocarbyl radicals and desirably cyclic hydrocarbyl radicals so as to form other contiguous ring structures, including, for example indenyl, azulenyl and fluorenyl groups. These additional ring structures can also be substituted or unsubstituted by hydrocarbyl radicals and desirably C1 to C20 hydrocarbyl radicals. Metallocene compounds can be combined with an activator and/or cocatalyst (as described in greater detail below) or the reaction product of an activator and/or cocatalyst, such as for example methylaluminoxane (MAO) and optionally an alkylation/scavenging agent such as trialkylaluminum compound (TEAL, TMA and/or TIBAL). Various types of metallocenes are known in the art, which can be supported. Typical support can be any support such as talc, an inorganic oxide, clay, and clay minerals, ion-exchanged layered compounds, diatomaceous earth, silicates, zeolites or a resinous support material such as a polyolefin. Specific inorganic oxides include silica and alumina, used alone or in combination with other inorganic oxides such as magnesia, titania, zirconia and the like. Non-metallocene transition metal compounds, such as titanium tetrachloride, are also incorporated into the supported catalyst component. The inorganic oxides used as support are characterized as having an average particle size ranging from 30 600 microns, desirably from 30 100 microns, a surface area of 50 1,000 square meters per gram, desirably from 100 400 square meters per gram, a pore volume of 0.5 3.5 cc/g, desirably from about 0.5 2 cc/g.

Any metallocene can be used in the practice of the invention. As used herein unless otherwise indicated, "metallocene" includes a single metallocene composition or two or more metallocene compositions. Metallocenes are typically bulky ligand transition metal compounds generally represented by the formula: $[L]_mM[A]_n$ where L is a bulky ligand, A is a leaving group, M is a transition metal and m and n are such that the total ligand valency corresponds to the transition metal valency. The ligands L and A can be bridged to each other, and if two ligands L and/or A are present, they can be bridged. The metallocene compound can be full-sandwich compounds having two or more ligands L which can be cyclopentadienyl ligands or cyclopentadiene derived ligands or half-sandwich compounds having one ligand L, which is a cyclopentadienyl ligand or cyclopentadienyl derived ligand. The transition metal atom can be a Column 4, 5, or 6 transition metal and/or a metal from the lanthanide and actinide series of the Periodic Table. Non-limiting examples of metals include zirconium, titanium, and hafnium. Other ligands can be bonded to the transition metal, such as a leaving group. Non-limiting examples of ligands include hydrocarbyl, hydrogen or any other univalent anionic ligand. A bridged metallocene, for example, can be described by the general formula: RCpCp-'MeQx. Me denotes a transition metal element and Cp and Cp' each denote a cyclopentadienyl group, each being the same or different and which can be either substituted or unsubstituted, Q is an alkyl or other hydrocarbyl or a halogen group, x is a number and can be within the range of 1 to 3 and R is a structural bridge extending between the cyclopentadienyl rings. Metallocene catalysts and metallocene catalysts systems that produce isotactic polyolefins are disclosed in U.S. Pat. Nos. 4,794,096 and 4,975,403 which are incorporated by reference herein. These patents disclose chiral, stereorigid metallocene catalysts that polymerize olefins to form isotactic polymers and are especially useful in the polymerization of highly isotactic polypropylene.

Suitable metallocene catalysts are disclosed in, for example, U.S. Pat. Nos. 4,530,914; 4,542,199; 4,769,910; 4,808,561; 4,871,705; 4,933,403; 4,937,299; 5,017,714; 5,026,798; 5,057,475; 5,120,867; 5,132,381; 5,155,180; 5,198,401; 5,278,119; 5,304,614; 5,324,800; 5,350,723; 5,391,790; 5,436,305; 5,510,502; 5,145,819; 5,243,001; 5,239,022; 5,329,033; 5,296,434; 5,276,208; 5,672,668; 5,304,614, 5,374,752; 5,510,502; 4,931,417; 5,532,396; 5,543,373; 6,100,214; 6,228,795; 6,124,230; 6,114,479; 6,117,955; 6,087,291; 6,140,432; 6,245,706; 6,194,341, 6,399,723, 6,380,334, 6,380,331, 6,380,330, 6,380,124, 6,380,123, 6,380,122, 6,380,121, 6,380,120, 6,376,627, 6,376,413, 6,376,412, 6,376,411, 6,376,410, 6,376,409, 6,376,408, 6,376,407, 5,635,437, 5,554,704, 6,218,558, 6,252,097, 6,255,515 and EP Publication Nos. 549 900; 576 970; and 611 773; and WO 97/32906; 98/22486; and 00/12565. Examples of catalysts suitable for the preparation of PPics are disclosed in U.S. Pat. Nos. 4,107,413; 4,294, 721; 4,439,540; 4,114,319; 4,220,554; 4,460,701; 4,562, 173; and 5,066,738.

Metallocenes can be used in combination with some form of activator in order to create an active catalyst system. The term "activator" is defined herein to be any compound or component, or combination of compounds or components, capable of enhancing the ability of one or more metallocenes to polymerize olefins to polyolefins. Alklyalumoxanes such as methylalumoxane (MAO) are commonly used as metallocene activators. Generally alkylalumoxanes contain about 5 to 40 of the repeating units. Alumoxane solutions, particularly methylalumoxane solutions, can be obtained from commercial vendors as solutions having various concentrations. There are a variety of methods for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,103,031 and EP-A-0 561 476, EP 0 279 586, EP-A-0 594 218 and WO 94/10180, each fully incorporated herein by reference.

Ionizing activators can also be used to activate metallocenes. These activators are neutral or ionic, or are compounds such as tri(n-butyl)ammonium tetrakis(pentafluorophenyl)borate, which ionize the neutral metallocene compound. Such ionizing compounds can contain an active proton, or some other cation associated with, but not coordinated or only loosely coordinated to, the remaining ion of the ionizing compound. Combinations of activators can also be used, for example, alumoxane and ionizing activators in combinations, see for example, WO 94/07928.

Descriptions of ionic catalysts for coordination polymerization comprised of metallocene cations activated by non-coordinating anions appear in the early work in EP-A-0 277 003, EP-A-0 277 004 and U.S. Pat. No. 5,198,401 and WO-A-92/00333 each fully incorporated herein by reference. These teach a desirable method of preparation wherein metallocenes (bisCp and monoCp) are protonated by an anion precursor such that an alkyl/hydride group is abstracted from a transition metal to make it both cationic and charge-balanced by the non-coordinating anion. Suitable ionic salts include tetrakis-substituted borate or aluminum salts having fluorided aryl-constituents such as phenyl, biphenyl and naphthyl.

The term "noncoordinating anion" ("NCA") means an anion which either does not coordinate to said cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion.

The use of ionizing ionic compounds not containing an active proton but capable of producing both the active metallocene cation and a noncoordinating anion is also known. See, for example, EP-A-0 426 637 and EP-A-0 573 403 each fully incorporated herein by reference. An additional method of making the ionic catalysts uses ionizing anion precursors which are initially neutral Lewis acids but form the cation and anion upon ionizing reaction with the metallocene compounds, for example the use of tris(pentafluorophenyl) borane, see EP-A-0 520 732, which is fully incorporated herein by reference. Ionic catalysts for addition polymerization can also be prepared by oxidation of the metal centers of transition metal compounds by anion precursors containing metallic oxidizing groups along with the anion groups, see EP-A-0 495 375, which is fully incorporated herein by reference.

Where the metal ligands include halogen moieties (for example, bis-cyclopentadienyl zirconium dichloride) which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944 and EP-A1-0 570 982 for in situ processes describing the reaction of alkyl aluminum compounds with dihalo-substituted metallocene compounds prior to or with the addition of activating anionic compounds.

Desirable methods for supporting ionic catalysts comprising metallocene cations and NCA are described in U.S. Pat. Nos. 5,643,847; 6,228,795; and 6,143,686, each fully incorporated herein by reference. When using the support composition, these NCA support methods can include using neutral anion precursors that are sufficiently strong Lewis acids to react with the hydroxyl reactive functionalities present on the silica surface such that the Lewis acid becomes covalently bound. Additionally, when the activator for the metallocene supported catalyst composition is a NCA, desirably the NCA is first added to the support composition followed by the addition of the metallocene catalyst. When the activator is MAO, desirably the MAO and metallocene catalyst are dissolved together in solution. The support is then contacted with the MAO/metallocene catalyst solution. Other methods and order of addition will be apparent to those skilled in the art.

Polyolefin Production

The polyolefin can be formed by placing one or more olefin monomer (e.g., ethylene, propylene) alone or with other monomers in a suitable reaction vessel in the presence of a catalyst (e.g., Ziegler-Natta, metallocene, etc.) and under suitable reaction conditions for polymerization thereof. Any suitable equipment and processes for polymerizing the olefin into a polymer can be used. For example, such processes can include solution phase, gas phase, slurry phase, bulk phase, high pressure processes or combinations thereof. Such processes are described in detail in U.S. Pat. Nos. 5,525,678; 6,420,580; 6,380,328; 6,359,072; 6,346,586; 6,340,730; 6,339,134; 6,300,436; 6,274,684; 6,271,323; 6,248,845; 6,245,868; 6,245,705; 6,242,545; 6,211,105; 6,207,606; 6,180,735; and 6,147,173, each fully incorporated herein by reference.

Polyolefins can be formed by a gas phase polymerization process. One example of a gas phase polymerization process includes a continuous cycle system, where a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers can be continuously cycled through a fluidized bed in the presence of a catalyst under reactive conditions. The cycling gas stream is generally withdrawn from the fluidized bed and recycled back into the reactor. Simultaneously, polymer product can be withdrawn from the reactor and fresh monomer can be added to replace the polymerized monomer. The reactor pressure in a gas phase process can vary from 100 psig to 500 psig, or from 200 psig to 400 psig, or from 250 psig to 350 psig. The reactor temperature in a gas phase process can be from 30° C. to 120° C. or from 60° C. to 115° C. or from 70° C. to 110° C. or from 70° C. to 95° C. Non-limiting examples of polymer processes are described in U.S. Pat. Nos. 4,543,399; 4,588,790; 5,028,670; 5,317,036; 5,352,749; 5,405,922; 5,436,304; 5,456,471; 5,462,999; 5,616,661; 5,627,242; 5,665,818; 5,677,375; and 5,668,228, which are incorporated herein by reference in their entirety.

PPics can be formed by a sequential polymerization process. The polymerization reaction can be carried out in a two-reactor configuration in which the catalyst, typically a Ziegler-Natta catalyst and propylene are charged into a first loop reactor equipped with a circulation pump. Within the reactor, the propylene homopolymer is produced on the surface of the catalyst particles. The propylene polymer-coated catalyst grains are then transferred to one or more secondary gas-phase reactors with a fluidized bed where the copolymer is produced by the copolymerization of the propylene and the ethylene in the presence of a catalyst, again typically a Ziegler-Natta catalyst described above. Standard equipment and procedures for polymerizing propylene and another alpha olefin such as ethylene into an impact copolymer are known to one skilled in the art.

2. Nucleating Agent

The polymer composition of the present invention also includes a nucleating agent, or a combination of nucleating agents, having an average particle size of less than, but not equal to, 2 microns. A nucleating agent can function to enhance the optical properties of the resin, improve the resin's processing productivity by speeding cycles, and/or enhance mechanical properties such as stiffness and heat resistance. By way of example, during crystallization of a polymer such as polypropylene, the crystals formed can be typically larger than the wavelength of light. Crystals of this size refract light, and thus can reduce the clarity of the copolymer. Without wishing to be limited by theory, a nucleating agent can provide a heterogeneous surface that acts as a crystallization site and increases the rate of polymer crystallization. In the presence of a nucleating agent, crystals can form at higher temperatures, and the higher rate of crystal formation can induce formation of smaller crystals such as spherulites. The smaller crystal size allows light to pass with reduced refraction, thereby increasing the clarity of the polymer. In an embodiment, any nucleating agent chemically compatible with the polymer resin, and that is able to reduce the isotropic and/or differential shrinkage thereof can be included in the composition in amounts effective to impart the desired physical properties. As exemplified in a non-limiting manner in the Examples, the nucleating agents having an average particle size of less than 2 microns can provide reduced warpage, reduced and/or uniform shrinkage, and/or impact properties as compared to materials that include larger sized nucleating agents. Isotropic shrinkage can be improved by at least 80%. In some embodiments, warpage is not observed or is minimal. As discussed above, it is believed that the very small sized nucleating particles are more uniformly dispersed in the polyolefin polymer, thus, creating more homogeneous spherulites within the polymer matrix. Consequently, shrinkage is similar in all direction due to this uniform "polyolefin crystals cloud" within the polymer matrix. It is believed that uniform dispersion of the PP crystals within the polymer matrix can act as a physical barrier to a growing crack. In some embodiments, the average particle size of the nucleating agent is from 0.001 to 1.9 microns (μm), or 0.6 to 1 microns or at least any one of, equal to any one of, or between any two of 0.001, 0.005, 0.01, 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1.0, 1.5, and 1.9 microns.

In an embodiment, the nucleating agent is ultrafine talc, a carboxylic acid, or salt thereof an organophosphate, pine rosin, or a sorbitol compound, or any combinations thereof.

Non-limiting examples of carboxylic acids or salts thereof include benzoate, a metal benzoate, sodium benzoate, lithium benzoate, norbornane carboxylic acid or a salt thereof: or any combinations thereof. In one embodiment, the nucleating agent is ultra-fine talc. The nucleating agent can be present in amounts of 100 ppm to about 20,000 ppm, from about 500 ppm to about 10,000 ppm, from about 1000 ppm to about 5000 ppm, or at least any one of equal to any one of or between any two of 100, 500, 1000, 1500, 2000, 2500, 3000, 3500, 4000, 4500, 5000, 5500, 6000, 6500, 7000, 7500, 8000, 8500, 9000, 9500, 10000, 11000, 12000, 13000, 14000, 15000, 16000, 1700, 1800, 1900, and 20000 ppm. Nucleating agents can be obtained from commercial sources or made using chemical processing. A commercial source for ultra-fine talc is MICROTUFF® AGD 609 by Mineral Technologies Inc. (USA).

3. Optional Additives

The polymer compositions of the present invention can further include at least one additive. Non-limiting examples of additives include an anti-blocking agent, an antistatic agent, an antioxidant, a neutralizing agent, a blowing agent, a crystallization aid, a dye, a flame retardant, a filler, an impact modifier, a mold release agent, an oil, another polymer, a pigment, a processing agent, a reinforcing agent, a nucleating agent, a clarifying agent, a slip agent, a flow modifier, a stabilizer, an UV resistance agent, and combinations thereof Additives are available from various commercial suppliers. Non-limiting examples of commercial additive suppliers include BASF (Germany), Dover Chemical Corporation (U.S.A.), AkzoNobel (The Netherlands), SIGMA ALDRICH® (U.S.A.), Atofina Chemicals, Inc., and the like.

In an embodiment, the polymer composition can include a mold release agent and an antistatic agent. The mold release agent and antistatic agent can be a combination of a metallic sterate and a glycerol ester, respectively. Ire an embodiment, the mold release agent and antistatic agent can be used in combination or individually. In some embodiments, the mold release agent and antistatic agent are the same compound. A non-limiting example of a suitable glycerol ester includes glycerol monosterate (GMS) present in amounts ranging iteratively from about 500 ppm to about 5000 ppm, alternatively from about 750 ppm to about 3000 ppm, alternatively from about 1000 ppm to about 2000 ppm, alternatively from about 1000 ppm to about 1500 ppm, alternatively about 1250 ppm. Without wishing to be limited by theory, an antistatic agent, e.g. GMS, can function by migrating to the surface of the polymeric material and creating a film with water that dissipates the static electricity present at the surface of the material. Antistatic agents present in the disclosed amounts can be effective at reducing the static electricity without negatively impacting the adhesion of additional components or materials such as colorants to the end-use articles prepared from the disclosed polymeric composition.

A non-limiting example of suitable mold release agent is a metallic stearate such as zinc stearate present in amounts ranging iteratively from about 500 ppm to about 5000 ppm, alternatively from about 500 ppm to about 3000 ppm, alternatively from about 750 ppm to about 2000 ppm, alternatively from about 750 ppm to about 1500 ppm, alternatively about 1000 ppm. Alternatively, the mold release agent is N,N' distearoylethylenediamine present in amounts ranging iteratively from about 250 ppm to about 2500 ppm, alternatively from about 500 ppm to about 2000 ppm, alternatively from about 750 ppm to about 1500 ppm, alternatively about 1000 ppm. Without wishing to be limited by theory, a mold release agent is used to reduce the extent of adhesion of the final molded part to the mold cavity. A mold release agent can be used to reduce the extent of adhesion of the final molded part to the mold cavity.

In an embodiment, the polymeric composition can include an acid neutralizer. In some embodiments, the acid neutralizer can be hydrotalcite present in amounts ranging iteratively from about 100 ppm to about 1000 ppm, alternatively from about 150 ppm to about 400 ppm, alternatively about 300 ppm. In some embodiments, the mold release agent and acid neutralizer comprise a single compound. A non-limiting example of a suitable combined mold release and acid neutralization agent can include calcium stearate present in amounts ranging iteratively from about 200 ppm to about 2000 ppm, alternatively from about 200 ppm to about 500 ppm, alternatively from about 350 ppm to about 1000 ppm, alternatively from about 350 ppm to about 750 ppm, alternatively about 500 ppm. The acid neutralizer can function to remove residue remaining in the polymer resin from the polymerization catalyst and to prevent corrosion of the mold cavity.

B. Preparation of Polymer Compositions

The preparation of the polymer compositions can be carried out in a customary mixing machine, in which the polyolefin and nucleating agent or combination of nucleating agents can be melted and mixed with the optional additives. Suitable machines are known to those skilled in the art. Non-limiting examples include mixers, kneaders, and extruders. In certain aspects, the process can be carried out in an extruder by introducing the additives during processing. Non-limiting examples of extruder can include single-screw extruders, contra-rotating and co-rotating twin-screw extruders, planetary-gear extruders, ring extruders, or co-kneaders. Additionally, the polyolefin and nucleating can also be dry-blended and the resulting polymer blend used in typical polymer processes (e.g., blown film extrusion, foam extrusion, sheet extrusion-thermoforming, etc.) In some embodiments, the nucleating agent can be obtained and mixed with the polypropylene and or one or more optional additives to produce the polymer blend of the present invention. The polyolefin, nucleating agent, or blend thereof can be subjected to an elevated temperature for a sufficient period of time during blending. The blending temperature can be above the softening point of the polymers. Such "melt mixing" or "melt compounding" assists in uniformly dispersing the nucleating agent in the polyolefin polymer matrix.

Additives can be premixed or added individually to the polymer composition. By way of example, the additives of the present invention can be premixed such that the blend is formed prior to adding it to the polyolefin and nucleating agent blend. The additive containing blend thereof can be subjected to an elevated temperature for a sufficient period of time during blending and/or incorporation of additives. Incorporation of additives into the polyolefin resin can be carried out, for example, by mixing the above-described components using methods customary in process technology. The blending temperature can be above the softening point of the polymers. In certain aspects, a process can be performed at a temperature from about 160° C. to 280° C. Such "melt mixing" or "melt compounding" results in uniform dispersion of the present additives in the polyolefin polymer matrix.

C. Polymer Compositions

The polymer composition can include a polyolefin polymer and a nucleating agent having an average particle size of less than 2 microns in the amounts described above. The nucleating agent can be a combination of different nucleating agents, and the overall average particle size of the combination of nucleating agents is less than 2 microns. In some embodiments, the polymer blend can include 100 ppm to about 20,000 ppm, from about 500 ppm to about 10,000 ppm, from about 1000 ppm to about 5000 ppm of the nucleating agent with the balance being polyolefin and optional additives.

The polymeric composition can display enhanced mechanical properties such as increased impact strength as reflected in an increased Izod Impact strength and/or increased stiffness as reflected in an increased flexural modulus and/or decreased shrinkage such as isotropic shrinkage and/or decreased warpage. Izod impact is defined as the kinetic energy needed to initiate a fracture in a specimen and continue the fracture until the specimen is broken. Tests of the Izod impact strength determine the resistance of a polymer sample to breakage by flexural shock as indicated by the energy expended from a pendulum type hammer in breaking a standard specimen in a single blow. The specimen is notched, which serves to concentrate the stress, and promotes a brittle rather than ductile fracture. Specifically, the Izod Impact test measures the amount of energy lost by the pendulum during the breakage of the test specimen. The energy lost by the pendulum is the sum of the energies required to initiate sample fracture, to propagate the fracture across the specimen, and any other energy loss associated with the measurement system (e.g., friction in the pendulum bearing, pendulum arm vibration, and sample toss energy). The polymer composition of the present invention can have an increased Izod impact value of at least 25%, 30%, at least 40%, at least 60%, or 25% to 60% or any value or range there between as compared to a comparable polymeric composition that includes the same polymer and the same nucleating agent, but the same nucleating agent has an average particle size greater than or equal to 2 For example, a composition of the present invention can have an Izod impact strength of 20 ft./lb., or at least 24 ft./lb. while the composition that includes larger sized nucleating agent has an Izod impact strength of less than 16 ft./lb.

In an embodiment, the polymeric composition described herein and end-use articles formed there from exhibit isotropic shrinkage of less than 20%, less than 10%, less than 5%, no shrinkage at all. The isotropic shrinkage of the composition can be 0% to 15% or 0% to 5%, or 0% to 1%. The polymer composition can have a less isotropic shrinkage than the polymer blend with a nucleating agent having an average particle size greater than 2 microns (e.g., talc having an average particle size of 2-6 mm). By way of example, the isotropic shrinkage of the composition of the present invention can be less than 80%, less than 90%, less than 95% or the reference sample.

D. Articles of Manufacture

The polymer blend compositions are normally collected as pellets, which can be stored for a time or employed immediately in a forming process. The forming processes can include injection molding, blown film, extrusion coating, extrusion blow molding, injection stretch blow molding, thermoforming, profile extrusion, compression molding or sheet extrusion. The final formed articles are for instance molded parts, sheets, films, fibers, etc. Examples of molded parts include an automobile part, a food container, a cap, a computer product, a fiber, a pipe, a film, a bottle, a non-food container, a cup, a lid, a plate, a tray, a blister pack, and artificial turf. Artificial turf can include at least one of pellets, matting, and blades.

In an embodiment, the plastics shaping process can include injection molding. In injection molding, a polymeric resin is fed to an injection molder through a hopper. Resins can enter an injection barrel by gravity through a feed throat where they are heated to the appropriate melt temperature. The molten resin can then be injected into a mold cavity where it is shaped into the desired part. The mold is cooled constantly to a temperature that allows the resin to solidify and be cool to the touch. The molten resin while filling the cavity flows in the direction of the injection which is termed in flow and also spreads out perpendicular to the injection flow in a direction termed the cross flow. In an embodiment, the polymeric compositions can be used to form end-use articles with a part weight of less than about 65 grams, alternatively from about 52 grams to about 55 grams, or at less than any one of, equal to one of, or between any two of 65, 64, 63, 62, 61, 60, 59, 58, 57, 56, 55 grams. These articles can be formed using a suitable injection molder operating at a cycle time of equal to or less than about 10 seconds, alternatively equal to or less than 7.0 seconds, alternatively equal to or less than about 6.5 seconds, alternatively equal to or less than about 6.0 seconds, alternatively from about 6.0 seconds to about 7.0 seconds. For example, for a high speed thin wall injection molder utilizing high cavitation stacked molds (e.g., having 16 cavities or greater) cycle times can be equal to or less than about 7.0 s, or about 1 s to 7 s, or about 1 s, 2 s, 3 s, 4 s, 5 s, 6 s, or 7 s or any range therein.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

(Effect of Nucleating Agents on Molded Articles)

TOTAL polypropylene 3727 having a MFR of 20 g/10 min (Fluff: 2.8), XS % of 4, XS range of 3.5 to 4.5 and a $C_2$ content of 0.6 wt. % was used to evaluate the nucleating agent of the present invention (talc having an average particle size of 0.8 microns) and a comparative nucleating agent (talc having an average particle size of 2-4 microns).

Figure 2:
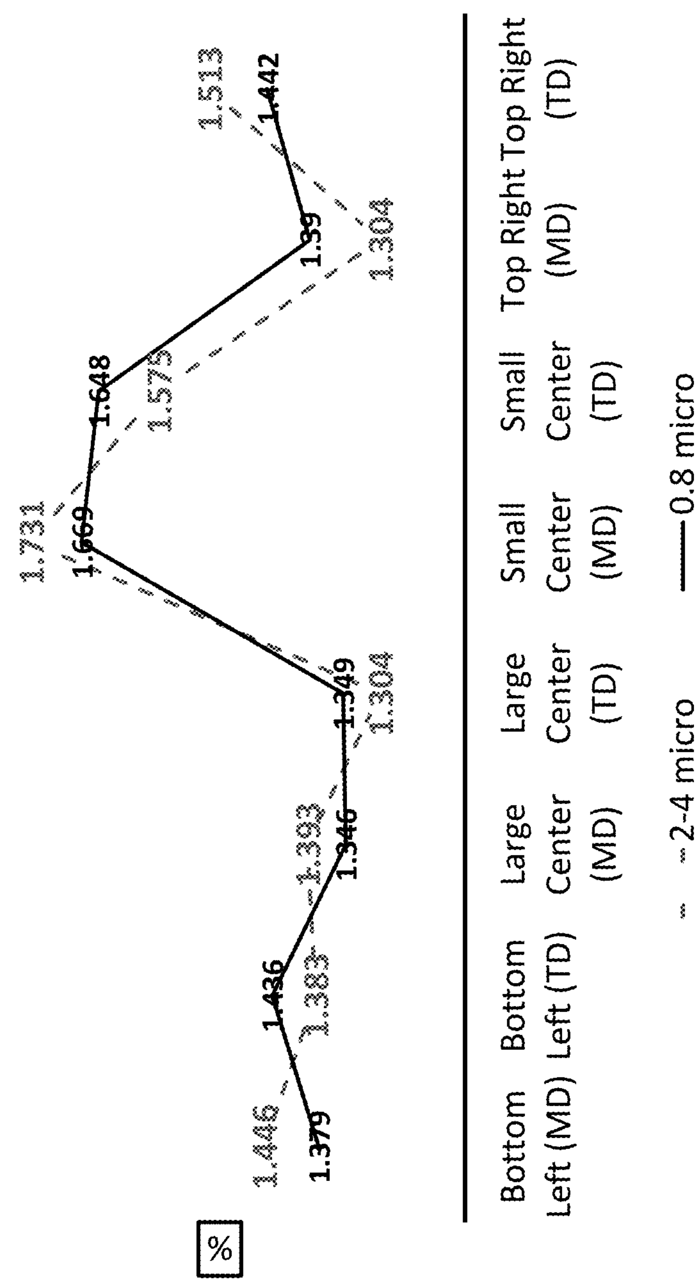
FIG. 2 shows the effect of the average particle size of the nucleating agent of the present invention having an average particle size of 0.8 microns versus a comparative nucleating agent having a particle size of 2 to 4 microns on shrinkage of a polypropylene polymer.
Figure 3:
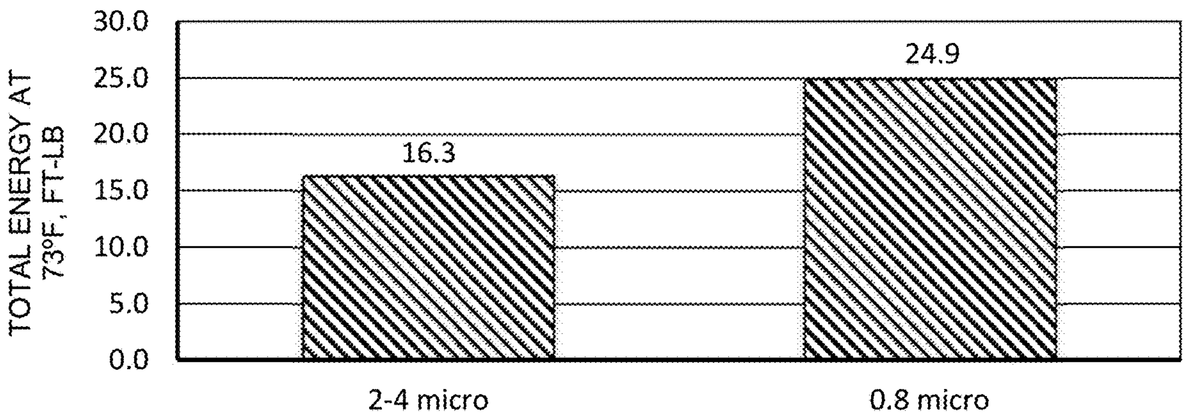
FIG. 3 shows the effect of the average particle size of the nucleating agent of the present invention having an average particle size of 0.8 microns versus a comparative nucleating agent having a particle size of 2 to 4 microns on instrumented impact (Izod impact) of a polypropylene polymer.

Shrinkage measurements were performed on a 60×60×2 mm plaque mold using a CNC (computerized numerical control) microscope: The QV Apex 302, a high-precision (1.5 micron accuracy) programmable microscope with a resolution of 0.1 micron. This instrument automatically and accurately determined the shrinkage properties across the plaque. FIG. 1 shows the effect of the talc particles size on the 3727 warpage. The shrinkage difference between MD and TD (MD shrinkage−TD shrinkage) was near 0 for the TOTAL POLYPROPYLENE 3727 nucleated with fine talc particles size which can be translated to a tendency to have reduced warpage in injection molded parts. FIG. 2 shows the effect of the talc particles size on the 3727 shrinkage. Table 1 lists the shrinkage values. Table 2 lists the decrease in shrinkage of the nucleating agent of the present invention versus the comparative nucleating agent. All these data demonstrated that TOTAL Polypropylene 3727 nucleated with fine talc particles size exhibited more homogeneous shrinkage in both longitudinal and transversal directions compared to bigger talc particles size. FIG. 3 shows the effect of talc particle size on 3727 instrumented impact (Izod impact). The instrumented impact properties were increased by 50% using the nucleating agent of the present invention as compared to the comparative nucleating agent. Based on these results, it is believed that using smaller talc particles size should lead to better impact properties as well as a much better uniform shrinkage in all directions and result in much less warpage of end-use articles without significantly affecting other mechanical and optical properties.

TABLE 1

| | | 2-4 Micro | 0.8 Micro | Unit |
|---|---|---|---|---|
| Shrinkage | Bottom Left (MD) | 1.446 | 1.379 | % |
| | Bottom Left (TD) | 1.383 | 1.436 | % |
| | Large Center (MD) | 1.393 | 1.346 | % |
| | Large Center (TD) | 1.304 | 1.349 | % |
| | Small Center (MD) | 1.731 | 1.669 | % |
| | Small Center (TD) | 1.575 | 1.648 | % |
| | Top Right (MD) | 1.304 | 1.39 | % |
| | Top Right (TD) | 1.513 | 1.442 | % |
| | Bottom Left (Diff) | −0.062 | 0.057 | % |
| | Large Center (Diff) | −0.0895 | 0.003 | % |
| | Small Center (Diff) | −0.157 | −0.021 | % |
| | Top Right (Diff) | 0.209 | 0.052 | % |

TABLE 2

| Shrinkage difference | Decrease compared to 2-4 Micro particles | Unit |
|---|---|---|
| Bottom Left | 8 | % |
| Large Center | 97 | % |
| Small Center | 87 | % |
| Top Right | 75 | % |

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein can be utilized. Accordingly, the appended claims are intended to include within their scope such processes, machines, manufacture, compositions of matter, means, methods, or steps.

The invention claimed is:

1. A polymeric composition comprising a polyolefin polymer and a nucleating agent having an average particle size of less than 2 micrometers (μm), wherein the average particle size is an equivalent spherical diameter determined by sedimentation, wherein the composition comprises 1,000 ppm to 10,000 ppm of the nucleating agent, and wherein the polyolefin polymer comprises a homopolymer, a random copolymer, an impact copolymer comprising a polypropylene homopolymer, and an ethylene-propylene rubber phase, or a combination thereof, wherein the polymeric composition exhibits more homogeneous shrinkage in longitudinal and transverse directions relative to a comparable polymeric composition comprising the same polyolefin polymer and the same nucleating agent, but wherein the same nucleating agent has an average particle size greater than or equal to 2 μm, such that the polymeric composition exhibits substantially no warpage.

2. The composition of claim 1, wherein the nucleating agent is talc.

3. The composition of claim 1, wherein the average particle size of the nucleating agent is 0.6 μm to 1.0 μm.

4. The composition of claim 1, wherein the composition has an isotropic shrinkage less than the isotropic shrinkage of the comparable polymeric composition comprising the same polyolefin polymer and the same nucleating agent, but wherein the same nucleating agent has the average particle size greater than or equal to 2 μm.

5. The composition of claim 4, wherein the isotropic shrinkage of the composition is less than 80% of the isotropic shrinkage of the comparable polymeric composition.

6. The composition of claim 4, wherein the isotropic shrinkage of the composition is 0% to 15%.

7. The composition of claim 1, wherein the composition has a differential shrinkage less than the differential shrinkage of the comparable polymeric composition comprising the same polyolefin polymer and the same nucleating agent, but wherein the same nucleating agent has the average particle size greater than or equal to 2 μm.

8. The composition of claim 1, wherein the composition has an increased Izod impact value of 25% to 60%, as compared to the comparable polymeric composition comprising the same polymer and the same nucleating agent, but wherein the same nucleating agent has the average particle size greater than or equal to 2 μm, and wherein Izod impact is measured by ASTM D-256-10.

9. The composition of claim 8, wherein the Izod impact is at least 20 ft.-lb.

10. The composition of claim 1, wherein the polyolefin polymer comprises polypropylene, polyethylene, or both.

11. The composition of claim 1, wherein the polyolefin polymer comprises the homopolymer, the random copolymer, or a combination thereof.

12. The composition of claim 11, wherein the homopolymer comprises polypropylene and up to about 5 wt. % of another $C_2$-$C_8$ alpha olefin.

13. The composition of claim 1, wherein the polyolefin polymer has a melt flow rate determined according to ASTM D 1238 at a temperature of 190° C. or 230° C. with a ram weight of 2.16 kg of from about 1 g/10 min. to about 200 g/10 min., a xylene solubles content of 3.5 to 4.5 wt. %, or combinations thereof.

14. The composition of claim 1, further comprising an additive, wherein the additive is an antioxidant, a neutralizing agent, an antistatic agent, a slip agent, a colorant, a mold release agent, an ultra-violet (UV) screening agent, an oxidant, an UV light absorbent, a fire retardant, a pigment, a dye, a filler, a flow modifier, or any combination thereof.

15. An article of manufacture comprising the polymeric composition of claim 1.

16. The article of claim 15, wherein the article is an automobile part, a food container, a cap, a computer product, a fiber, a pipe, a film, a bottle, a non-food container, a cup, a lid, a plate, a tray, a blister pack, and artificial turf.

17. A method of making an article of manufacture comprising shaping a polymeric composition comprising a polyolefin polymer and a nucleating agent having an average particle size of less than 2 micrometers (μm), wherein the average particle size is an equivalent spherical diameter determined by sedimentation, wherein the composition comprises 1,000 ppm to 10,000 ppm of the nucleating agent, and wherein the polyolefin polymer comprises a homopolymer, a random copolymer, an impact copolymer comprising a polypropylene homopolymer, an ethylene-propylene rubber phase, or a combination thereof, wherein the polymeric composition exhibits more homogeneous shrinkage in longitudinal and transverse directions relative to a comparable polymeric composition comprising the same polyolefin polymer and the same nucleating agent, but wherein the same nucleating agent has an average particle size greater than or equal to 2 μm, such that the polymeric composition exhibits substantially no warpage.

18. The method of claim 17, wherein the shaping comprises:

injecting a flowable polymeric composition into a mold;

solidifying the polymeric composition; and releasing the solidified composition from the mold, wherein the volume difference between the flowable polymeric composition and the solidified composition is less than 20%.

19. The method of claim 18, wherein the injection molding of the polymeric composition into the article of manufacture comprises a cycle time of equal to or less than about 10 seconds.

20. A method of reducing warpage in a polyolefin polymer, the method comprising adding a nucleating agent having an average particle size of less than 2 micrometers (μm) to the polyolefin polymer to form the polyolefin composition, wherein the average particle size is an equivalent spherical diameter determined by sedimentation, wherein the nucleating agent is added to the polyolefin polymer such that the nucleating agent is present in the composition in an amount from 1,000 ppm to 10,000 ppm, and wherein the polyolefin polymer comprises a homopolymer, a random copolymer, an impact copolymer comprising a polypropylene homopolymer, an ethylene-propylene rubber phase, or a combination thereof, wherein the polymeric composition exhibits more homogeneous shrinkage in longitudinal and transverse directions relative to a comparable polymeric composition comprising the same polyolefin polymer and the same nucleating agent, but wherein the same nucleating agent has an average particle size greater than or equal to 2 μm, such that the polymeric composition exhibits substantially no warpage.

21. The method of claim 20, wherein the nucleating agent comprises talc.

22. The method of claim 20, wherein the polyolefin polymer comprises homopolymers, random copolymers, or a combination thereof.

23. The method of claim 20, wherein the polyolefin composition has a differential shrinkage less than the differential shrinkage of a comparable polymeric composition comprising the same polyolefin polymer and the same nucleating agent, but wherein the same nucleating agent has an average particle size greater than or equal to 2 μm.

24. The method of claim 20, wherein the composition has an isotropic shrinkage less than the isotropic shrinkage of a comparable polymeric composition comprising the same polyolefin polymer and the same nucleating agent, but wherein the same nucleating agent has an average particle size greater than or equal to 2 μm.

25. The method of claim 20, wherein the isotropic shrinkage of the composition is 0% to 15%.

* * * * *